(12) United States Patent
Kim

(10) Patent No.: US 6,861,474 B2
(45) Date of Patent: Mar. 1, 2005

(54) GOLF BALL LAYERS AND METHOD OF MANUFACTURE

(75) Inventor: Hyun Jin Kim, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 0 days.

(21) Appl. No.: 10/033,205

(22) Filed: Dec. 28, 2001

(65) Prior Publication Data

US 2003/0130052 A1 Jul. 10, 2003

(51) Int. Cl.⁷ .......................... A63B 37/12; C08L 53/02
(52) U.S. Cl. .......................... 525/71; 525/93; 473/373; 473/374; 473/378; 473/385
(58) Field of Search ................... 525/71, 93; 473/373, 473/374, 378, 385

(56) References Cited

U.S. PATENT DOCUMENTS

| | | | |
|---|---|---|---|
| 4,858,924 A | 8/1989 | Saito et al. ................. 273/62 |
| 4,919,434 A | 4/1990 | Saito ..................... 273/235 R |
| 4,986,545 A | 1/1991 | Sullivan .................. 273/235 R |
| 5,098,105 A | 3/1992 | Sullivan .................. 273/235 R |
| 5,191,024 A | 3/1993 | Shibata et al. ............... 525/314 |
| 5,306,779 A | 4/1994 | Shibata et al. ............... 525/314 |
| 5,504,156 A | 4/1996 | Takezaki et al. ............... 525/93 |
| 5,693,711 A | 12/1997 | Akiba et al. ................. 525/93 |
| 5,717,014 A * | 2/1998 | Ohkawachi | |
| 5,824,740 A | 10/1998 | Yabuki et al. ................. 525/71 |
| 5,830,087 A | 11/1998 | Sullivan et al. ............. 473/385 |
| 5,848,943 A | 12/1998 | Sano et al. .................. 473/365 |
| 5,948,862 A * | 9/1999 | Sano | |
| 5,948,864 A | 9/1999 | Rajagopalan ................ 525/132 |
| 5,981,654 A | 11/1999 | Rajagopalan ................. 525/66 |
| 6,004,226 A | 12/1999 | Asakura ..................... 473/373 |
| 6,210,291 B1 * | 4/2001 | Kato et al. ................... 473/357 |
| 6,268,437 B1 * | 7/2001 | Takesue | |
| 6,359,065 B1 * | 3/2002 | Yabuki | |
| 6,508,725 B1 * | 1/2003 | Kim | |

FOREIGN PATENT DOCUMENTS

JP           2000026677      *   1/2000

* cited by examiner

*Primary Examiner*—David J. Buttner
(74) *Attorney, Agent, or Firm*—Sheppard, Mullin, Richter & Hampton LLP

(57) ABSTRACT

Golf ball cover and intermediate layers incorporate specified triblock copolymers, a base polymer, and also a polymeric modifier that incorporates an impact modifier, a copolymer or terpolymer having specified functional groups, or mixtures of these. The ball layers provide for good ball characteristics, including feel and controllability, while also providing for superior shear-cut resistance and resistance to cracking. Related methods for making golf ball layers provide for balls having these characteristics.

16 Claims, No Drawings

GOLF BALL LAYERS AND METHOD OF MANUFACTURE

BACKGROUND OF THE INVENTION

This invention relates generally to golf ball cover and intermediate layers and, more particularly, to golf ball layers for use in making golf ball covers and intermediate layers to optimize ball performance. This invention also relates to methods of manufacture of such golf ball layers.

Golf balls generally include a core and at least one layer surrounding the core. Balls can be classified as two-piece, wound, or multi-layer balls. Two-piece balls include a spherical inner core and an outer cover layer. Wound balls include a core, a rubber thread wound under tension around the core to a desired diameter, and a cover layer. Cover layers for wound ball generally are made of balata material or thermoset polyurethane. Multi-layer balls include a core, a cover layer, and one or more intermediate layers.

Generally, two-piece balls have good durability and distance when hit, but poor "feel"—the overall sensation transmitted to the golfer while hitting the ball—and low spin rate, which results in poor ball control. Wound balls having balata covers generally have high spin rate, leading to good control, and they also have good feel, but they have poor durability and short distance in comparison to two-piece balls. Multi-layer balls generally have performance characteristics between those of two-piece and wound balls; that is, multi-layer balls exhibit durability and distance inferior to two-piece balls but superior to wound balata balls, and they exhibit feel and spin rate inferior to wound balata balls but superior to two-piece balls.

Material characteristics of the compositions used in the core, cover, and any intermediate layers of golf balls are among the important factors that determine the performance of the balls. In particular, the composition of the cover layer is important in determining the ball's durability, shear-cut resistance, speed, spin rate, hitting sound (the sound made by a golf club head when it hits the ball), and feel. Various materials having different physical properties are used to make cover layers to create a ball having the most desirable performance possible. In particular, cover layers of many commercially available balls are made using soft or hard ionomeric resins, elastomeric resins, or blends of these.

Ionomeric resins used generally are ionomeric copolymers of an olefin and a metal salt of a unsaturated carboxylic acid, or ionomeric terpolymers having a co-monomer within its structure. These resins vary in resiliency, flexural modulus, and hardness. Examples of these resins include those marketed under the trademark SURLYN manufactured by E.I. DuPont de Nemours & Company of Wilmington, Del., and IOTEK manufactured by ExxonMobil Corporation of Irving, Tex. Ionomeric copolymers have been have been particularly favored for use in golf ball covers because they produce ball covers having excellent durability and high resilience. Ionomeric terpolymers are used to produce covers having improved spin and feel, though at the cost of ball speed and durability. Elastomeric resins used in golf ball covers include a variety of thermoplastic or thermoset elastomers available, such as polyurethane, polyetherester elastomer, polyamide elastomer, and terpolymeric ionomer.

A particular elastomeric material that provides for good performance when used in making ball covers and intermediate layers is a triblock copolymer having a first polymer block comprising an aromatic vinyl compound, a second polymer block comprising a diene compound, and a hydroxyl group located at a block copolymer, or the hydrogenation product of this triblock copolymer. An example of this block copolymer having a hydroxyl group at the terminal block copolymer is sold under the trademark HG-252 by Kuraray Company of Kurashiki, Japan. Incorporation of this material into ball covers and intermediate layers allow for balls having good feel while retaining good ball speed and shear-cut durability, properties which typically are difficult to maximize at once.

However, it has been observed that covers incorporating these triblock copolymers can suffer from cracks after being hit during play. During endurance testing of balls having covers incorporating these triblock copolymers, crack initiation and propagation was observed in the covers. This cracking leads to substantial deterioration in ball performance and long-term durability. These cracks also can initiate in an intermediate layer and subsequently propagate to a cover. Additionally, shear-cut resistance in the covers needs to be further improved for optimal performance.

In view of the above, it is apparent that golf ball cover and intermediate layers are needed that allow the optimization of golf ball performance properties by incorporating triblock copolymers into the layers, while eliminating or reducing formation of cracks in the covers and intermediate layers. The ball layers also should provide little or no processing and preparation difficulties beyond that provided by present layers. The present invention fulfills this need and other needs, and provides further related advantages.

SUMMARY OF THE INVENTION

The present invention is embodied in a golf ball component selected from the group consisting of a cover and an intermediate layer located between a golf ball core and a cover, the golf ball component incorporating a particular triblock copolymer, an ionomeric base polymer, and a polymeric modifier. The triblock copolymer has a first polymer block comprising an aromatic vinyl compound. The triblock copolymer also includes a second polymer block, which includes a first compound selected from the group consisting of a dime compound and a hydrogenation product of the diene compound. In addition, the triblock copolymer includes a third polymer block including a second compound selected from the group consisting of a diene compound, a hydrogenation product of the dime compound, and an aromatic vinyl compound. Furthermore, the triblock copolymer includes at least one hydroxyl group. The polymeric modifier is selected from the group consisting of methyl methacrylate butyacrylate styrene, methyl methacrylate ethyl hexylacrylate styrene, methacrylate-butadiene-styrene, ethylene vinyl acetate, acrylonitrile-butadiene-styrene, chlorinated polyethylene, a polymer including a maleic anhydride group and mixtures thereof.

The base polymer can incorporate an ionomeric polymer comprising copolymeric polymers, terpolymeric polymers, or mixtures of these. The ratio by weight of the triblock copolymer to the base polymer in the golf ball component preferably ranges between about 10:90 and about 90:10, more preferably between about 10:90 and about 70:30, and most preferably between about 10:90 and about 60:40.

When incorporating the impact modifier, the golf ball component incorporates the impact modifier in an amount between about 0.1 and about 15 parts per hundred by weight of the total amount of the triblock copolymer and the base polymer, and more preferably between about 1 and about 10 parts per hundred. When incorporating the functionalized polymer, the golf ball component preferably incorporates the functionalized polymer in an amount between about 0.1 and about 15 parts per hundred by weight of the total amount of the triblock copolymer and the base polymer, more preferably between about 1 and about 10 parts per hundred. The golf ball component preferably incorporates a total amount of polymeric modifier less than about 20 parts per hundred by weight of the total amount of the triblock copolymer and the base polymer, and more preferably less than about 15 parts per hundred.

Golf ball components within the scope of the present invention also can incorporate UV stabilizers, photostabilizers, photoinitiators, co-initiators, antioxidants, colorants, dispersants, mold releasing agents, processing aids, inorganic fillers, organic fillers, or mixtures thereof.

The present invention also resides in a method for making a golf ball component selected from the group consisting of a cover and an intermediate layer located between a golf ball core and a cover, the method including preparing a composition comprising the above-specified triblock copolymer, an ionomeric base polymer, and a polymeric modifier as defined above, and then incorporating the composition into the golf ball component. The step of preparing the composition can incorporate dry-blending the composition, or it can incorporate mixing the composition using a mill, internal mixer, or extruder. The step of mixing the composition also can incorporate melting the composition.

Other features and advantages of the present invention should become apparent from the following detailed description of the preferred embodiments.

DESCRIPTION OF THE PREFERRED EMBODIMENTS

The present invention is embodied in a golf ball cover or intermediate layer that incorporates: (a) a triblock copolymer having a first polymer block comprising an aromatic vinyl compound, a second polymer block comprising a diene compound, and a hydroxyl group located at a block copolymer, or the hydrogenation product of this triblock copolymer; (b) a base polymer that includes ionomeric polymer, non-ionomeric polymer, or mixtures of these; and, (c) a polymeric modifier incorporating an impact modifier, or a copolymer or terpolymer having a glycidyl group, hydroxyl group, maleic anhydride group or carboxylic group (these collectively referred to as "functionalized polymer,") or a mixture of these. The invention also is embodied in methods of manufacture of such a golf ball cover. Addition of polymeric modifier to the ball cover reduces or eliminates fracturing in these covers from repeated impacts during play.

In the ball layers described above, the ratio by weight of triblock copolymer to base polymer preferably ranges between about 10:90 and about 90:10. More preferably, this ratio ranges between about 10:90 and about 70:30, and most preferably, this ratio ranges between about 10:90 and about 60:40. The amount of impact modifier or functionalized polymer in the ball layer preferably ranges between about 0.1 to about 15 parts per hundred by weight of the total amount of triblock copolymer and base polymer, more preferably between about 1 and about 10 parts per hundred. The amount of polymeric modifier in the ball layer preferably is less than about 20 parts per hundred by weight of the total amount of triblock copolymer and base polymer, more preferably less than about 15 parts per hundred by weight.

Impact modifiers suitable for use in the present invention include: acrylic impact modifiers, such as methyl methacrylate butylacrylate styrene, or methyl methacrylate ethyl hexylacrylate styrene; methacrylate-butadiene-styrene (MBS); ethylene vinyl acetate; polyaryl ether; acrylonitrile-butadiene-styrene (ABS); methacrylate-butadiene-styrene (MBS); and, chlorinated polyethylene (CPE). Acrylic impact modifiers, such as methyl methacrylate butylacrylate styrene or methyl methacrylate ethyl hexylacrylate styrene, are prepared by grafting methyl methacrylate onto an alkyl acrylate elastomer. Examples of commercially available acrylic impact modifiers include Paralaloid KM-334, Paralaloid KM-342, Paralaloid KM-355, Paralaloid KM-365, Paralaloid KM-369, Paraloid EXL-2314, Paraloid EXL-3300, Paraloid EXL-3361, and HIA-80 marketed by Rohm & Haas Co. Ethylene vinyl acetate used in the ball covers of the present invention can fall within a range of vinyl acetate content, but to optimize impact modification properties, they preferably have a vinyl acetate content for the purpose of impact modification ranging between about 15% to about 60%, more preferably between about 30% to about 50%, and most preferably between about 40% and about 50%. ABS impact modifiers are prepared by polymerizing styrene and acrylonitrile onto a polybutadiene or polybutadiene substrate. MBS impact modifiers are prepared by grafting methyl methacrylate or mixtures of methyl methacrylate and styrene onto polybutadiene or polybutadiene styrene rubber. Examples of commercially available MBS impact modifiers include Paraloid BTA-702S, Paraloid BTA-711, Paraloid BTA-736S, Paraloid BTA-740, Paraloid BTA-753, Paraloid BTA-780S, and Paraloid EXL-2600 marketed by Rohm & Haas Co. CPE polymers are prepared by chlorinating HDPE (high density polyethylene).

As discussed above, the base polymer can incorporate ionomeric polymers. Suitable ionomeric polymers include copolymeric ionomers and terpolymeric ionomers, or mixtures of these. Copolymeric ionomers are obtained by neutralizing at least a portion of carboxylic groups in a copolymer of an α-olefin and an α,β-unsaturated carboxylic acid having 3 to 8 carbon atoms, with a metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Copolymeric ionomers include ionomers having varied acid contents and degrees of acid neutralization, neutralized by monovalent or bivalent cations, such as lithium, sodium, potassium, magnesium, calcium, barium, lead, tin, zinc, aluminum, or a combination of these.

Terpolymeric ionomers are obtained by neutralizing at least portion of carboxylic groups in a terpolymer of an α-olefin, and an α,β-unsaturated carboxylic acid having 3 to 8 carbon atoms and an α,β-unsaturated carboxylate having 2 to 22 carbon atoms with metal ion. Examples of suitable α-olefins include ethylene, propylene, 1-butene, and 1-hexene. Examples of suitable unsaturated carboxylic acids include acrylic, methacrylic, ethacrylic, alphachloroacrylic, crotonic, maleic, fumaric, and itaconic acid. Terpolymeric ionomers include ionomers having varied acid contents and degrees of acid neutralization, neutralized by monovalent or bivalent cations, such as lithium, sodium, potassium, magnesium, calcium, barium, lead, tin, zinc, aluminum, or a combination of these.

As discussed above, the base polymer also can incorporate non-ionomeric polymers. Suitable non-ionomeric polymers include thermoplastic elastomer, thermoset elastomer, thermoplastic rubber, thermoplastic vulcanizate, polycarbonate, polyolefin, polyamide, copolymeric polyamide, polyesters, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, styrenic terpolymer, cellulose polymer, liquid crystal polymer (LCP), ehtylene-propylene-diene-monomer (EPDM), ethylene vinyl acetate (EVA), and polysiloxane. Particularly suitable non-ionomeric polymers for use within the scope of the present invention include polyethyleneterephthalate, polybutyleneterephthalate, polyphenylenesulfide, polypropyleneoxide, polyphenyloxide, polypropylene, polyethylene, polycarbonate, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), dynamically vulcanized polypropylene/ethylene-propylene diene copolymer, polyether or polyester thermoplastic urethane, and thermoset polyurethane. Suitable polyamides include resins obtained by: polycondensation of a dicarboxylic acid, such as oxalic acid, adipic acid, sebacic acid, terephthalic acid, isophthalic acid or 1,4 cyclohexylidicarboxylic acid, with a diamine, such as ethylenediamine, tetramethylenediamine, pentamethylenediamine, hexamethylenediamine or decamethylenediamine, 1,4-cyclohexyldiamine or m-xylylenediamine; a ring-opening polymerization of cyclic lactam, such as ε-caprolactam or ω-laurolactam; polycondensation of an aminocarboxylic acid, such as 6-aminocaproic acid, 9-aminononaoic acid, 11-aminoudecanoic acid or 12-aminododecanoic acid; or, copolymerization of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

Examples of suitable non-ionomeric polymers include those sold under the trademarks LEXAN, VALOX, NORYL, and NORYL GTX, marketed by GE Plastics of Pittsfield, Mass., CRISTAMID and RILSAN marketed by ATOFINA Chemicals of Philadelphia, Pa., GRILAMID marketed by EMS-CHEMIE of Sumter, S.C., ZYTEL marketed by E.I. DuPont de Nemours & Co. of Wilmington, Del., TENITE marketed by Eastman Chemical Company of Kingsport, Tenn., EXXPOL marketed by Exxon Mobil of Houston, Tex., and ESTANE marketed by BFGoodrich of Cleveland, Ohio.

As discussed above, the polymeric modifier in the ball covers or intermediate layers of the present invention can include copolymers or terpolymers having a glycidyl group, hydroxyl group, maleic anhydride group or carboxylic group, collectively referred to as functionalized polymers. These copolymers and terpolymers comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-docosene, 1-tetracocene, 1-hexacocene, 1-octacocene, and 1-triacontene. One or more of these α-olefins may be used.

Examples of suitable glycidyl groups in copolymers or terpolymers in the polymeric modifier include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5 diglyxidylcarboxylate, cyclohexene-4-glycidyl carobxylate, 5-norboenene-2-methyl-2-glycidyl carboxylate, and endocis-bicyclo(2,2,1)-5-heptene-2,3-diglycidyl dicaroboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers. Examples of suitable terpolymers having a glycidyl group include LOTADER AX8900 and AX8920, marketed by Atofina Chemicals, ELVALOY marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Atofina Chemicals; EXXELOR VA1803, a maleic anyhydride-modified ethylene-propylene copoylmer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Shell Chemical.

Golf ball cover or intermediate layers within the scope of the present invention also can include, in suitable amounts, one or more additional ingredients generally employed in golf balls and ball compositions. Agents provided to achieve specific functions, such as additives and stabilizers, can be present. Suitable ingredients include UV stabilizers, photostabilizers, antioxidants, colorants, dispersants, mold releasing agents, and processing aids.

Golf ball cover or intermediate layers within the scope of the present invention also can incorporate inorganic fillers, such as titanium dioxide, calcium carbonate, zinc sulfide or zinc oxide. Additional fillers can be chosen to impart additional density to blends of golf balls and ball compositions within the scope of the present invention, such as zinc oxide, barium sulfate, tungsten or any other metallic powder having density higher than that of base polymeric resin. Any organic or inorganic fibers, either continuous or non-continuous, also can be in the compositions.

The present invention also resides in methods for making golf ball covers and intermediate layers incorporating the above-described triblock copolymer, base polymer, and polymeric modifier. The methods can incorporate a number of known processes for making ball covers and intermediate layers. The various components of the covers and intermediate layers can be mixed together simultaneously or sequentially. Dry blending equipment, such as a tumbler mixer, V-blender, or ribbon blender, can be used to prepare the cover compositions. The components also can be mixed together or added sequentially to the composition using a mill, internal mixer, extruder or combinations of these, with or without application of thermal energy to produce melting or chemical reaction.

In methods within the scope of the present invention, the polymeric modifier can be premixed with the triblock copolymer and base polymer to form a concentrate having a high concentration of polymeric modifier. Then, this concentrate can be introduced into a blend of triblock copolymer and base polymer using dry blending or melt mixing. The polymeric modifier also can be added to a color concentrate, which is then added to the composition to impart a white color to golf ball. Any combination of the above-mentioned mixing processes can be incorporated into methods within the scope of the present invention.

EXAMPLE

Golf balls having covers within the scope of the present invention were prepared and tested for various properties. Two groups of twelve balls each were prepared.

Test Group I included Ball Types 1–6 having covers within the scope of the present invention, and Ball Type 7 as comparison balls. Group I balls each had a core having a diameter of 1.48 in. and a compression of 70, and also an intermediate layer over the core having a thickness of 0.05 in. and a Shore D hardness of 40. A cover layer having a thickness of 0.05 in. was placed over each intermediate layer. The cover layers of Ball Types 1 to 6 comprised a triblock copolymer (HG-252), an ionomeric polymer (SURLYN 6120) and an impact modifier (EXL 2691A, marketed by Rohm & Haas Co.). The cover layers of Ball Types 4 to 6 further comprised a terpolymer incorporating maleic anhydride (LOTADER AX 3410). The cover layers of Ball Type 7 incorporated only triblock copolymer and ionomeric polymer, and these balls were used as comparison balls. The compositions of the covers of the Group I ball types are shown in Table 1 below.

Test Group II included Ball Types 8–12 having covers within the scope of the present invention, and Ball Type 13 as comparison balls. Group II balls each had a core having a diameter of 1.58 in. and a compression of 70. A cover layer having a thickness of 0.05 in. was placed over each core. The cover layers of Ball Types 8 to 12 comprised a triblock copolymer (HG-252), an ionomeric polymer (SURLYN 6120) and an impact modifier (EXL 2691A, marketed by Rohm & Haas Co.). The cover layers of Ball Types 10 to 12 further comprised a terpolymer incorporating maleic anhydride (LOTADER AX 3410). The cover layers of Ball Type 13 incorporated only triblock copolymer and ionomeric polymer and were used as comparison balls. The compositions of the covers of the Group II ball types are shown in Table 2 below.

TABLE 2

Composition of Group II Ball Covers

|  | Type 8 | Type 9 | Type 10 | Type 11 | Type 12 | Type 13 |
|---|---|---|---|---|---|---|
| HG-252 wt % | 50 | 50 | 50 | 50 | 50 | 50 |
| Surlyn 6120 wt % | 50 | 50 | 50 | 50 | 50 | 50 |
| EXL 2691A pph | 2 | 4 | 2 | 2 | 4 | 0 |
| Lotader AX 3410 pph | 0 | 0 | 2 | 4 | 2 | 0 |

Test Group III included Ball Types 14 to 17 having covers within the scope of the present invention, and Ball Type 18 as comparison balls. Group III balls each had a core having a diameter of 1.48 in. and a compression of 70, and also an intermediate layer over the core having a thickness of 0.05 in. and a Shore D hardness of 40. A cover layer having a thickness of 0.05 in. was placed over each intermediate layer. The cover layers of Ball Types 14 to 17 comprised a triblock copolymer (HG-252), an ionomeric polymer (SURLYN 6120), and either a terpolymer incorporating maleic anhydride (LOTADER AX 3410), or a terpolymer incorporating a glycidyl group (either LOTADER AX 8900 or AX 8920). The cover layers of Ball Type 18 incorporated only triblock copolymer and ionomeric polymer, and these balls were used as comparison balls. The compositions of the Group III ball types are shown in Table 3 below.

TABLE 1

Composition of Group I Ball Covers

|  | Type 1 | Type 2 | Type 3 | Type 4 | Type 5 | Type 6 | Type 7 |
|---|---|---|---|---|---|---|---|
| HG-252 wt % | 50 | 50 | 50 | 50 | 50 | 50 | 50 |
| Surlyn 6120 wt % | 50 | 50 | 50 | 50 | 50 | 50 | 50 |
| EXL 2691A pph | 2 | 4 | 6 | 2 | 2 | 4 | 0 |
| Lotader AX 3410 pph | 0 | 0 | 0 | 2 | 4 | 2 | 0 |

TABLE 3

Composition of Group III Ball Covers

|  | Type 14 | Type 15 | Type 16 | Type 17 | Type 18 |
|---|---|---|---|---|---|
| HG-252 wt % | 50 | 50 | 50 | 50 | 50 |
| Surlyn 6120 wt % | 50 | 50 | 50 | 50 | 50 |
| Lotader AX 8900 pph | 2 | 0 | 0 | 0 | 0 |
| Lotader AX 8920 pph | 0 | 2 | 4 | 0 | 0 |
| Lotader AX 3410 pph | 0 | 0 | 0 | 4 | 0 |

The balls described above were tested for cover hardness, PGA compression, and speed and spin when hit using an 8-Iron under controlled conditions. The balls also were tested for shear-cut resistance, determined by examining the balls after they were impacted by a pitching wedge, classifying each numerically from 1 (excellent) to 5 (poor), and averaging the results for a given ball type. Finally, the balls were tested for endurance to repeated impacts, by determining the number of balls that failed after 50, 100 and 150 impacts. Failure was determined by inspection for visible cracking or splitting of the cover. Besides the balls described above, four balls the Tour Balata, Professional, and HP Tour marketed by Titleist Company, and the Tour Accuracy marketed by Nike Company, also were tested for the same parameters, except for endurance. Results of the testing for Groups I, II and III are shown in Tables 4, 5 and 6 below.

TABLE 4

Test Results of Group I Ball Covers and Comparison Balls

|  | Type 1 | Type 2 | Type 3 | Type 4 | Type 5 | Type 6 | Type 7 | Tour Balata | HP Tour |
|---|---|---|---|---|---|---|---|---|---|
| Cover hardness Shore D | 50 | 49 | 50 | 49 | 49 | 49 | 51 | 48 | 58 |
| PGA Comp. | 69 | 71 | 71 | 70 | 69 | 70 | 68 | 76 | 71 |
| 8 Iron speed mph | 109.3 | 109.3 | 108.6 | 109.0 | 108.5 | 108.7 | 108.8 | 108.5 | 108.6 |
| 8 Iron spin rpm | 8781 | 8854 | 8645 | 8802 | 8645 | 8723 | 8836 | 9010 | 7760 |
| Shear-cut Resist. | 1.8 | 2.0 | 1.4 | 1.6 | 2.1 | 2.0 | 2.5 | 4.4 | 1.8 |
| Failure at 50 hits | 0 | 0 | 0 | 0 | 0 | 0 | 1 | — | — |
| Failure at 100 hits | 0 | 0 | 0 | 0 | 0 | 0 | 4 | — | — |
| Failure at 150 hits | 0 | 0 | 2 | 3 | 3 | 3 | 5 | — | — |

TABLE 5

Test Results of Group II Ball Covers and Comparison Balls

|  | Type 8 | Type 9 | Type 10 | Type 11 | Type 12 | Type 13 | HP Tour | Tour Balata | Profess. | Tour Accuracy |
|---|---|---|---|---|---|---|---|---|---|---|
| Cover hardness Shore D | 51 | 50 | 50 | 50 | 50 | 53 | 58 | 48 | 59 | 49 |
| PGA Comp. | 72 | 71 | 70 | 70 | 71 | 66 | 71 | 76 | 86 | 77 |
| 8 Iron speed mph | 108.7 | 108.7 | 108.8 | 108.7 | 108.9 | 109.2 | 108.6 | 108.5 | 107.9 | 108.9 |
| 8 Iron spin rpm | 8532 | 8463 | 8394 | 8499 | 8324 | 8576 | 7760 | 9010 | 7734 | 7881 |
| Shear-cut Resist. | 2.1 | 1.9 | 1.7 | 2.4 | 2.6 | 2.9 | 1.8 | 4.5 | 3.3 | 3.2 |
| Failure at 50 hits | 0 | 0 | 0 | 0 | 0 | 1 | — | — | — | — |
| Failure at 100 hits | 0 | 0 | 0 | 0 | 0 | 3 | — | — | — | — |
| Failure at 150 hits | 2 | 0 | 0 | 0 | 1 | 4 | — | — | — | — |

TABLE 6

Test Results of Group III Ball Covers and Comparison Balls

| | Type 14 | Type 15 | Type 16 | Type 17 | Type 18 | Tour Balata | Profess. | Tour Accuracy |
|---|---|---|---|---|---|---|---|---|
| Cover hardness Shore D | 51 | 51 | 50 | 50 | 52 | 48 | 58 | 49 |
| PGA Comp. | 68 | 70 | 70 | 69 | 72 | 76 | 86 | 77 |
| 8 Iron speed mph | 109.7 | 109.9 | 110.0 | 109.7 | 109.9 | 108.9 | 107.9 | 110.3 |
| 8 Iron spin rpm | 8437 | 8302 | 8168 | 8177 | 8307 | 8984 | 7734 | 7907 |
| Shear-cut Resist. | 1.4 | 1.6 | 1.7 | 2.4 | 2.3 | 5.0 | 2.8 | 4.3 |
| Failure at 50 hits | 0 | 0 | 0 | 1 | 6 | — | — | — |
| Failure at 100 hits | 0 | 0 | 0 | 1 | Test stopped | — | — | — |
| Failure at 150 hits | 6 | 6 | 4 | 6 | Test stopped | — | — | — |

Discussion

The results of the testing indicate that covers within the scope of the present invention possess good performance properties and exhibit high resistance to shear-cut and fracture.

Focusing on test results for Group I balls, Ball Types 1 to 6 (having covers within the scope of the present invention) demonstrated superior shear-cut resistance to Ball Type 7 and to both of the marketed balls. Ball Types 1 to 6 also demonstrated superior resistance to failure to Ball Type 7, particularly through 100 hits. The superior shear-cut resistance and performance on impact endurance of Ball Types 1 to 6 was achieved without increasing cover hardness and without sacrificing any ball performance in comparison to Ball Type 7. Ball Types 1 to 6 also exhibited comparable or higher 8 Iron speed than that of the comparison balls, as well as comparable ball spin rate, which relates to ball controllability, and PGA compression. In particular, the performance of Ball Types 1 to 6 was similar to that of the Tour Balata balls, balls having a wound layer and a similar cover hardness to that of Ball Types 1 to 6. However, Ball Types 1 to 6 exhibited far superior shear-cut resistance to Tour Balata balls. When compared to HP Tour balls having cover hardness of 58 Shore D, Ball Types 1–6 exhibited better or comparable shear-cut resistance and ball performance, while having cover hardness in the range of 49 to 50 Shore D. Low cover hardness is an indicator of good ball feel when hit. Overall, balls in Group I incorporating covers within the scope of the present invention exhibited a superior combination of good feel, good ball performance, superior shear-cut resistance, and higher impact durability than the comparison balls.

Test results for Group II balls indicate similar results. Ball Types 8 to 12 (having covers within the scope of the present invention), exhibit superior shear-cut resistance to Ball Type 13, without having increased cover hardness or sacrificing ball performance. With respect to comparison Ball Type 13, Ball Types 8 to 12 exhibited dramatically superior resistance to failure through 50, 100, or 150 hits. Ball Types 8 to 12 exhibited comparable shear-cut resistance to that of the HP Tour balls, while providing markedly higher ball spin rate and lower cover hardness, indicating good ball controllability and feel. Ball Types 8 to 12 exhibited dramatically superior shear-cut resistance than the Tour Balata and Tour Accuracy balls having similar cover hardness. With respect to the Professional balls, Ball Types 8 to 12 were superior in all respects tested, providing much lower cover hardness, higher ball speed and spin rate, and superior shear-cut resistance. In general, Ball Types 8 to 12, within the scope of the present invention, provided a superior combination of performance characteristics than the comparison balls.

Test results for Group III balls are consistent with those for Groups I and II. Ball Types 14 to 17 (having covers within the scope of the present invention), when compared to Ball Type 18 and the marketed balls, exhibit similar or lower cover hardness, similar ball speed, and generally similar spin rate. Ball Types 14 to 17 also exhibit good shear-cut and impact endurance. In particular, Ball Types 14 to 16 exhibited shear-cut resistance superior to Ball Type 18. Ball Types 14 to 17 exhibited shear-cut resistance superior to the Tour Balata, and Tour Accuracy, while having similar cover hardness. With respect to the Professional balls, Ball Types 14 to 17 exhibited superior shear-cut resistance, even though they also provided a much lower cover hardness. Ball Types 14 to 17 also exhibited superior resistance to impact failure than comparison Ball Type 18, particularly through 50 impacts. While only Ball Type 14 demonstrated even one failure through 50 hits, comparison Ball Type 18 exhibited 6 failures, or a 50% failure rate. Ball Types 14 to 17 did not show such failure rates until after 150 hits. Ball Types 14 to 17, like the balls tested above, provided generally superior performance over the tested parameters to the comparison balls.

Although the invention has been disclosed in detail with reference only to the preferred embodiments, those skilled in the art will appreciate that additional golf ball covers can be made without departing from the scope of the invention. Accordingly, the invention is identified by the following claims.

I claim:

1. A golf ball component selected from the group consisting of a cover and an intermediate layer located between a golf ball core and a cover, the golf ball component comprising:
   (a) a triblock copolymer having:
      (i) a first polymer block comprising an aromatic vinyl compound,
      (ii) a second polymer block including a first compound selected from the group consisting of a diene compound and a hydrogenation product of the diene compound, (iii) a third polymer block including a second compound selected from the group consisting of a diene compound, a hydrogenation product of the diene compound, and an aromatic vinyl compound, and (iv) at least one hydroxyl group;

(b) an ionomeric base polymer; and (c) a polymeric modifier selected from the group consisting of methyl methacrylate butylacrylate styrene, methyl methacrylate ethyl hexylacrylate styrene, methacrylate-butadiene-styrene, ethylene vinyl acetate, acrylonitrile-butadiene-styrene, chlorinated polyethylene, a polymer including a maleic anhydride group, and mixtures thereof.

2. The golf ball component as defined in claim 1, wherein the base polymer includes an ionomeric polymer selected from the group consisting of copolymeric polymers, terpolymoric polymers, and mixtures thereof.

3. The golf ball component as defined in claim 1, wherein a ratio by weight of the triblock copolymer to the base polymer ranges between about 10:90 and about 90:10.

4. The golf ball component as defined in claim 1, wherein a ratio by weight of the triblock copolymer to the base polymer ranges between about 10:90 and about 70:30.

5. The golf ball component as defined in claim 1, wherein a ratio by weight of the triblock copolymer to the base polymer ranges between about 10:90 and about 60:40.

6. The golf ball component as defined in claim 1, wherein the golf ball component includes the polymeric modifier in an amount between about 0.1 and about 15 parts per hundred by weight of a total amount of the triblock copolymer and the base polymer.

7. The golf ball component as defined in claim 1, wherein the golf ball component includes the polymeric modifier in an amount between about 1 and about 10 parts per hundred by weight of a total amount of the triblock copolymer and the base polymer.

8. The golf ball component as defined in claim 1, wherein the golf ball component includes the polymeric modifier in an amount less than about 20 parts per hundred by weight of a total amount of the triblock copolymer and the base polymer.

9. The golf ball component as defined in claim 1, wherein the golf ball component includes the polymeric modifier in an amount less than about 15 parts per hundred by weight of a total amount of the triblock copolymer and the base polymer.

10. The golf ball component as defined in claim 1, further comprising an ingredient selected from the group consisting of UV stabilizers, photostabilizers, photoinitiators, co-initiators, antioxidants, colorants, dispersants, mold releasing agents, processing aids, inorganic fillers, organic fillers, and mixtures thereof.

11. The golf ball component as defined in claim 1, wherein the polymer including a maleic anhydride group is selected from the group consisting of maleic anhydride-modified ethylene-propylene copolymer, maleic anhydride-modified ethylene-propylene-diene terpolymers, maleic anhydride-modified polyethylene, maleic anhydride-modified polypropylenes, ethylene-ethylacrylate maleic anhydride terpolymers, and maleic anhydride-indene-styrene-cumarone polymers.

12. A method for making a golf ball component selected from the group consisting of a cover and an intermediate layer located between a golf ball core and a cover, the method comprising:

preparing a composition comprising (a) a triblock copolymer having:

(i) a first polymer black comprising an aromatic vinyl compound, (ii) a second polymer block including a first compound selected from the group consisting of a diene compound and a hydrogenation product of the diene compound.

(iii) a third polymer block including a second compound selected from the group consisting of a diene compound, a hydrogenation product of the diene compound, and an aromatic vinyl compound, and (iv) at least one hydroxyl group;

(b) an ionomeric base polymer; and (C) a polymeric modifier selected from the group consisting of methyl methacrylate butadiene styrene, methyl methacrylate ethyl hexylacrylate styrene, methacrylate-butadiene-styrene, ethylene vinyl acetate, acrylonitrile-butadiene-styrene, chlorinated polyethylene, a polymer including a maleic anhydride group, and mixtures thereof; and incorporating the composition into the golf ball component.

13. The method as defined in claim 12, wherein the step of preparing a composition comprises a step of dry-blending the composition.

14. The method as defined in claim 12, wherein the step of preparing a composition comprises a step of mixing the composition using a device selected from the group consisting of a mill, an internal mixer, and an extruder.

15. The method as defined in claim 14, wherein the step of mixing the composition comprises melting the composition.

16. A golf ball comprising:

(A) a core; and (B) an outer cover layer; and optionally (C) one or more intermediate layers located between the core and the outer cover layer; and wherein the outer cover layer, and/or the one or more intermediate layers if present, comprises a blend of:

(a) a triblock copolymer having:

(i) a first polymer block comprising an aromatic vinyl compound, (ii) a second polymer block including a first compound selected from the group consisting of a diene compound and a hydrogenation product of the diene compound, (iii) a third polymer block including a second compound selected from the group consisting of a diene compound, a hydrogenation product of the diene compound, and an aromatic vinyl compound, and (iv) at least one hydroxyl group;

(b) an ionomeric base polymer; and (c) a polymeric modifier selected from the group consisting of methyl methacrylate butylacrylate styrene, methyl methacrylate ethyl hexylacrylate styrene, methacrylate-butadiene-styrene, ethylene vinyl acetate, acrylonitrile-butadiene-styrene, chlorinated polyethylene, a polymer including a maleic anhydride group, and mixtures thereof.

* * * * *

UNITED STATES PATENT AND TRADEMARK OFFICE
CERTIFICATE OF CORRECTION

PATENT NO. : 6,861,474 B2
DATED : March 1, 2005
INVENTOR(S) : Hyun Jin Kim

It is certified that error appears in the above-identified patent and that said Letters Patent is hereby corrected as shown below:

Column 2,
Lines 41 and 45, "dime" should be -- diene --.

Column 14,
Line 5, "black" should be -- block --.
Line 17, "(C)" should be -- (c) --.

Signed and Sealed this

Sixteenth Day of August, 2005

JON W. DUDAS
*Director of the United States Patent and Trademark Office*